INVENTORS
WILLIAM P. GINGRAS
FREDERICK JONKER

BY Homer R Montague
ATTORNEY

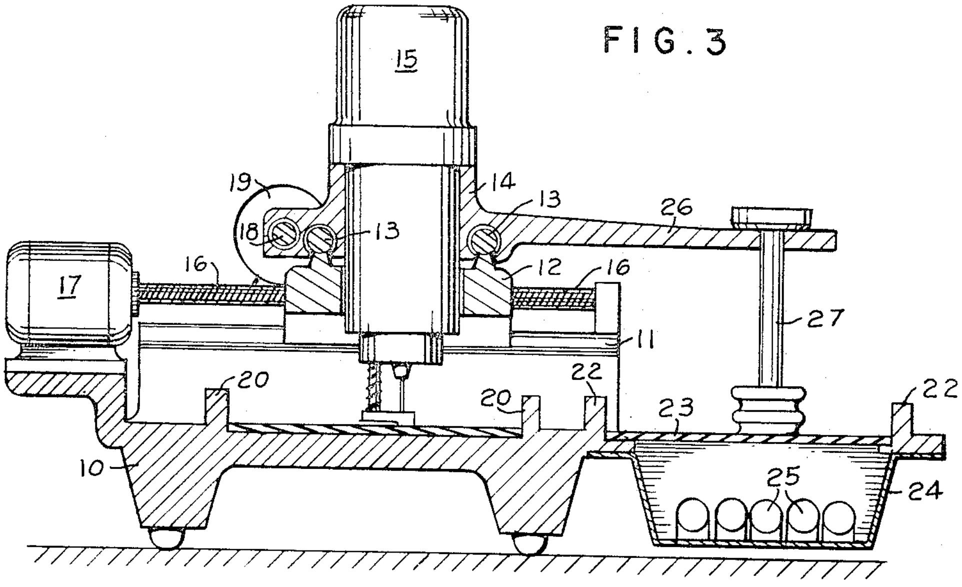
FIG. 3
FIG. 6
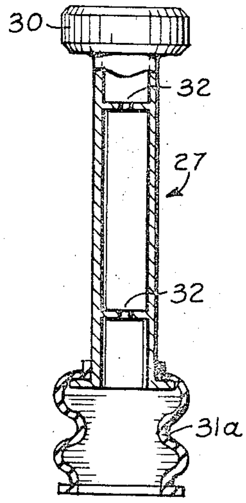
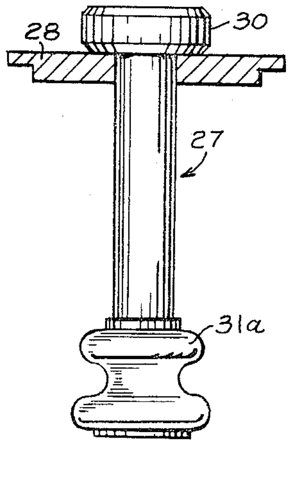
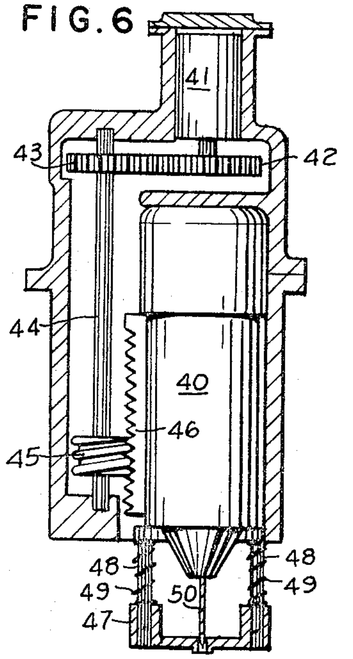
FIG. 5
FIG. 4
INVENTORS
WILLIAM P. GINGRAS
FREDERICK JONKER
BY Homer R. Montague
ATTORNEY Aug. 8, 1967 W. P. GINGRAS ETAL 3,335,283

VERSATILE INFORMATION STORAGE AND RETRIEVAL SYSTEM INCLUDING PHOTOCELL SCANNING

Filed April 11, 1963 6 Sheets-Sheet 3

INVENTORS
WILLIAM P. GINGRAS
FREDERICK JONKER

BY Homer R. Montague
ATTORNEY

INVENTORS
WILLIAM P. GINGRAS
FREDERICK JONKER
BY Homer R. Montague
ATTORNEY

INVENTORS
WILLIAM P. GINGRAS
FREDERICK JONKER
BY Homer R. Montague
ATTORNEY

INVENTORS
WILLIAM P. GINGRAS
FREDERICK JONKER
BY Homer R. Montague
ATTORNEY 3,335,283

VERSATILE INFORMATION STORAGE AND RETRIEVAL SYSTEM INCLUDING PHOTOCELL SCANNING

William P. Gingras, Rockville, Md., and Frederick Jonker, Washington, D.C., assignors to Jonker Business Machines, Inc., a corporation of Delaware Filed Apr. 11, 1963, Ser. No. 272,481
12 Claims. (Cl. 250—219)

ABSTRACT OF THE DISCLOSURE

Servomotor control of data-entry and data-retrieval operations, in peek-a-boo card handling equipment of the cross-carriage X–Y axis type, includes reversible drill-carriage and scanner-carriage motors, and a reversible drill-feed motor. The carriage positions are controlled by data input sources (keyboard, reader) for card drilling, and are scanned under control of photoelectric card-hole sensors for card-hole position readout.

In systems of this kind there is a card for every term or characteristic required to describe all of the information items of a certain information collection. Usually a "vocabulary" of 500–5000 terms is required. Thus there will be a corresponding number of term cards.

Each item of information in the collection is generally identified by a serial number.

If the information collection comprises, for example, 10,000 items, there will be 10,000 discrete positions on each term card, each of which is dedicated to one of the 10,000 items of information in the collection. These positions are generally arranged in an X–Y coordinate system.

In systems of this nature the X-coordinate of a position usually corresponds to the last digits of the serial number of the corresponding item. The Y-coordinate of this same position then corresponds to the first two digits of the serial number of this same item.

An item of information is entered into this system by taking all of the term cards corresponding to the terms by which the item has been indexed, and perforating each of said cards at the position corresponding to the serial number of that item of information.

The system is searched by a combination of terms by taking the cards corresponding to said terms and placing them in superimposition. Coinciding holes in these cards then designate the search results.

Systems of this nature are well known in the art. They are sometimes referred to as peek-a-boo systems. They are commercially known as Termatrex systems. An apparatus to perform said functions is described in U.S. Patent No. 3,052,150 issued Sept. 4, 1962.

It is, of course, also possible to code items by a different code than the one based on X–Y coordinates described above. It is also possible to code an item by making several holes for each item. The invention encompasses all of these possible methods of coding items on the cards.

It is, of course, also possible to have cards which in various combinations form a characteristic, instead of having a characteristic for each card. The invention encompasses all of these possible methods of defining a characteristic.

However, the invention will for the sake of simplicity be described on the basis of one card for each characteristic and one hole for each item whereby the item number corresponds to the coordinates of the hole.

*Summary of the invention*

The invention provides for automated control of peek-a-boo card drilling and card-reading machines of the general type shown in U.S. Patent 3,052,150 of 1962. For making new cards, an external keyboard or data source supplies input information defining card positions to be drilled in an X–Y coordinate system, and a pair of servo motors correspondingly drive the drill-supporting carriages in succession to those points. The drilling at each point follows automatically. For read-out, the same motors control a sequential scanning of a photoelectric sensor over the record cards, with automatic registration of the numbers, or the coordinates, of card-hole occurrences.

The invention will now be explained with reference to the following figures:

FIGURES 2 and 3 show two views partially in section of one embodiment of the system.

FIGURE 4 shows an embodiment of the scanning head of FIGURES 2 and 3.

FIGURE 5 shows the same part adapted for use in the systems of FIGURES 7 and 8.

FIGURE 6 shows a view partially in section of the automatically programmed drill.

*Entry, readout and reproducer*

Figure 1:
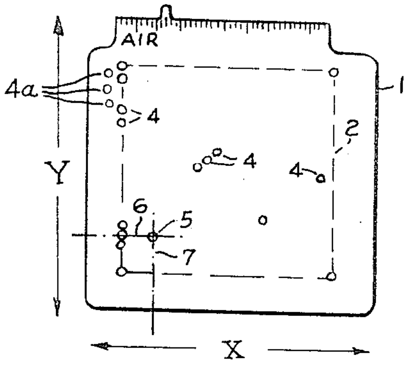
FIGURE 1 shows a term card.

FIGURE 1 shows an example of a term card dedicated to the term "air." Numeral 1 designates the outline of the card. Numeral 2 designates the area within which holes may be made. Numerals 4 designate a number of such holes. If the X and Y coordinates, 6 and 7, of hole 5 are 30 and 25 positions respectively, the hole #5 corresponds to document 2530.

Figure 2:
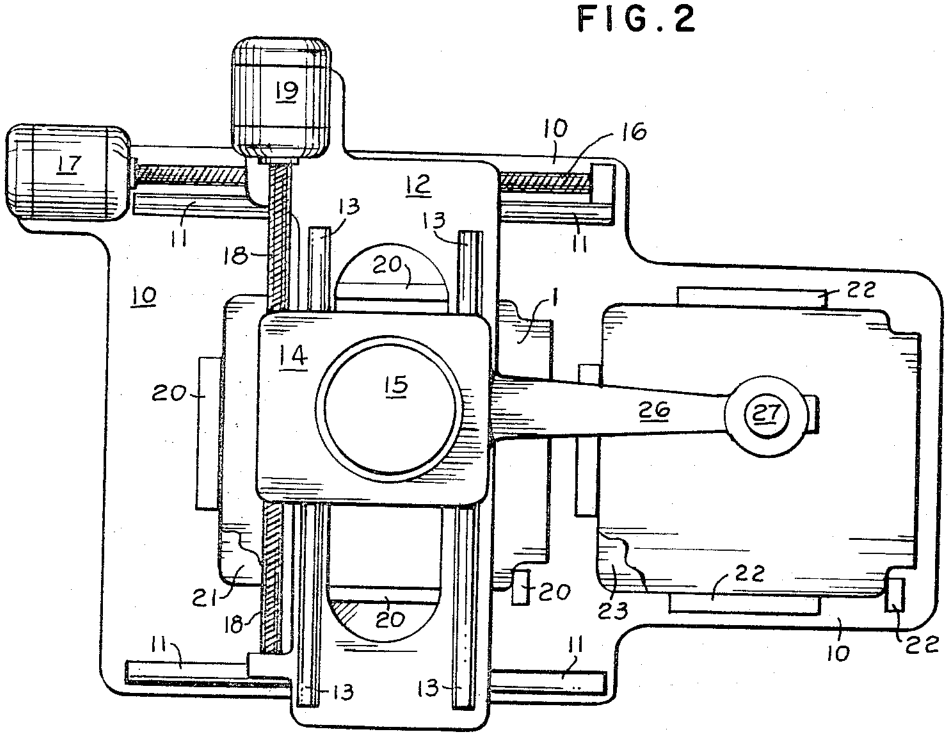

FIGURES 2 and 3 show two views, partially in section, of an embodiment of the invention encompassing a viewing device with a light sensor coupled to a drilling device operated by servo mechanisms.

The device comprises a frame 10 and mounted on this frame two parallel rails 11. Slidingly mounted on the rails 11 is a cross carriage 12. This cross carriage in turn has two parallel rails 13. Slidingly mounted on the rails of this cross carriage is drill carriage 14. Mounted on this drill carriage is an automatic drill 15, to be described in detail later. Cross carriage 12 can be moved back and forth by means of a helical screw 16 which engages said cross carriage, and is driven by a servo device 17. Drill carriage 14 is driven by a helical screw 18 which engages said drill carriage, and in turn by a servo device 19.

Servo devices 17 and 19 have been arranged in such a manner that each of them can bring the corresponding carriage to one out of a number of fixed and pre-determined positions, corresponding to the dedication of positions on the term cards, to documents. In the case of the example of a matrix of 100 x 100 the servo devices can be programmed to bring their respective carriages to any one out of 100 positions. The frame 10 also feaures alignment blocks 20 within which term cards can be superimposed in order to be drilled. A removable plate 21, the backup plate, allows the drills to run completely through cards without making holes in the frame 10.

Alignment blocks 22 can hold a term card for the purposes of scanning the same. A translucent plate 23 acts as a diffusor for a lightbox 24 in which a number of light sources 25 have been mounted. An extension arm 26 of drill carriage 14 carries a sensor 27.

FIGURE 4 shows the details of the light sensor 27. It features a photocell or other light sensitive device 30, as well as a rubber boot 31*a* or comparable type of light shield. If the sensor is placed exactly over a hole in a term card, a light ray will penetrate through the narrow holes 32 to actuate the photocell 30.

The servo mechanisms of the device of FIGURES 2 and 3 can be programmed in such a manner that the scanning head 27 will travel row by row over a card or a number of cards superimposed within the aligning blocks 22. Within the aligning blocks 20 one card or a number of cards can be placed in superimposition. The photosensitive element 30 is coupled to the servo devices and their drive elements in such a manner that every time the photocell is actuated, the drill 15 will also be actuated and drill a hole in the cards placed below this drill. Thus by proper programming the movements of the scanner head, the device can act as a card reproducer, or it can be made to make new cards having a hole pattern corresponding to the coincidence of holes of a number of cards.

It is also possible to make negatives of single term cards or of the pattern of coincident holes of a number of cards placed in superimposition within alignment blocks 22 by switching the circuitry in such a manner that the drill is only actuated when the photocell does *not* receive any light. Thus one or more copies can be made of the "negatives" or single cards or of the image of superimposed cards.

It is, of course, also possible to use the device not as a reproducer, but as readout device that feeds its information, for example, into an automatic microfilm storage device in which the text of documents, etc. is stored. For example, there is a device commercially known as the Lodestar Reader which can receive a four-digit number and will thereupon display the corresponding document.

The primary use of the device is, of course, for data entry. In that case there are two modes of operation. Blank term cards can be placed within the alignment blocks 20, and a keyboard which connects two servo devices 17 and 19 can receive the numbers which will have to be drilled.

It is also possible to tie automatic readers of punched cards or punched paper tape or magnetic tape or any other data processing media to this device. In that case such an automatic reader will provide the numbers to be drilled, and the servo mechanism and its drives will perform the drilling action. The servo mechanisms, their power sources and the keyboard or automatic readers of other data processing media, which are to actuate it, will be described in detail later.

*Manual embodiment of the invention*

It is also possible to operate the devices of FIGURES 2 and 3 and FIGURES 7 and 8 manually. In that case the servo mechanisms 17 and 19 are replaced by two cranks with detents in such a manner that turning of the crank from one detented position to another corresponds to a movement of the carriages of one position.

*Entry and readout device*

Figure 7:
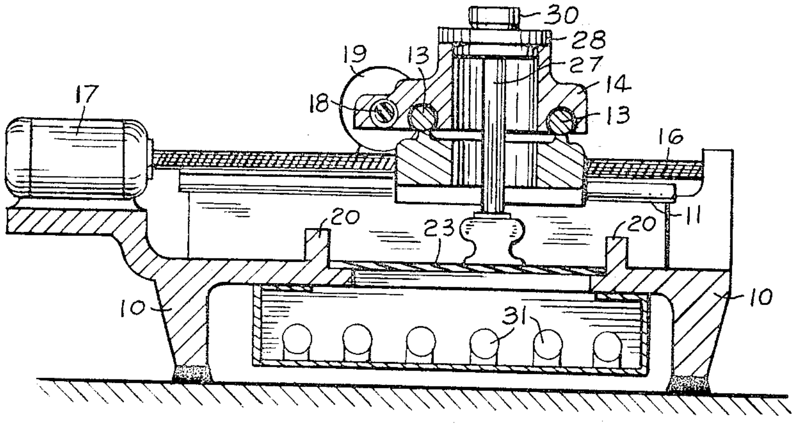
FIGURE 7 and 8 show two views partially in section of a different embodiment of the invention.
Figure 8:
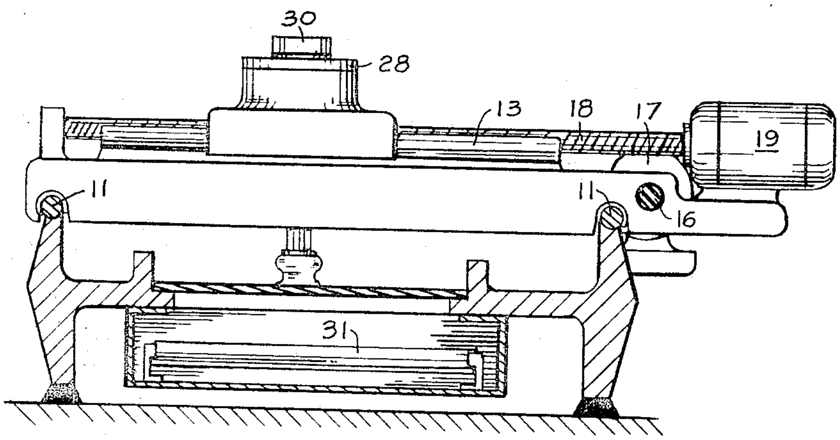

FIGURES 7 and 8 shows a simplified embodiment of the invention. This device can be used for data entry, in which case a drill 15 as shown in FIGURES 2 and 3 will be mounted in drill carriage 14. Or it could be used as an automatic readout, in which case scanning head 27, attached to an adaptor 28 as shown in FIGURE 5, can be placed in drill carriage 14 instead of the drill 15.

The device features a lightbox with a number of light sources 31 as well as a diffusor plate 23 below the cross carriage and drill carriage. The servo devices and associated equipment will be comparable to the earlier described system.

Figure 9:
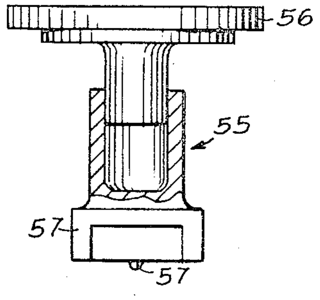
FIGURE 9 shows a mechanical feeler.

Instead of a light sensitive sensor it is, of course, also possible to use a mechanical feeler assembly 55 as shown in FIGURE 9. Part 56 fits in the drill carriage. It serves to guide the contact foot 57 which can slide up and down along part 56. At the bottom of part 57 is the microswitch 58. Part 57 is quite heavy so that the foot will rest on the cards, and the microswitch, which is normally open, will only close when its feeler will penetrate a hole. This type of sensor can be used with the device of FIGURES 3 and 4, as well as with the device of FIGURES 7 and 8 or the manual embodiment of the same described earlier.

*Automatic drill*

The automatic drill 15 provides for a rotary drill which is automatically lowered to the cards and advanced through the cards at the required feed speed, after which the drill retracts automatically. This drill cycle is entirely automatic.

It is possible to add to the drill a pressure foot assembly as shown in FIGURE 6. This pressure foot 47 can slide up and down on pins 48 mounted in the frame of the drill motor 40. Coil springs 49 keep the foot 47 in engagement with the cards during the drilling operation when the twist drill 50 is advanced through the bushing in the foot 47 into the cards. The pressure from coil springs 49 exerted on foot 47 also serves to strip the cards off the twist drill. The pressure foot assembly shown in FIGURE 6 is only an example of the construction of such a device. Many other different types of construction are possible.

As far as the drive of the twist drill and its advance into the cards and retraction is concerned, many different types of embodiment of such a device are possible. FIGURE 6 shows one possible embodiment. Numeral 40 designates a drill motor which drives a rotary twist drill 50. The drill motor is accurately guided for travel in a lengthwise direction. It is moved up and down by means of an electric motor 41 which through pinions 42 and 43 and drive shaft 44 moves motor 40 up and down by means of the rack 46 and wormwheel 45. The rack 46 is mounted on motor 40 and wormwheel 45 mounted on drive shaft 44. Limit switches regulate the automatic drill cycle. After the drill motor reaches the end of its travel, a limit switch reverses the action of the motor 41. After the drill motor returns to its top position, a limit switch turns off drill motor 40 and drive motor 41. Circuitry to accomplish this is well known in the art and need not be described in detail.

*Servo mechanism*

Figure 10:
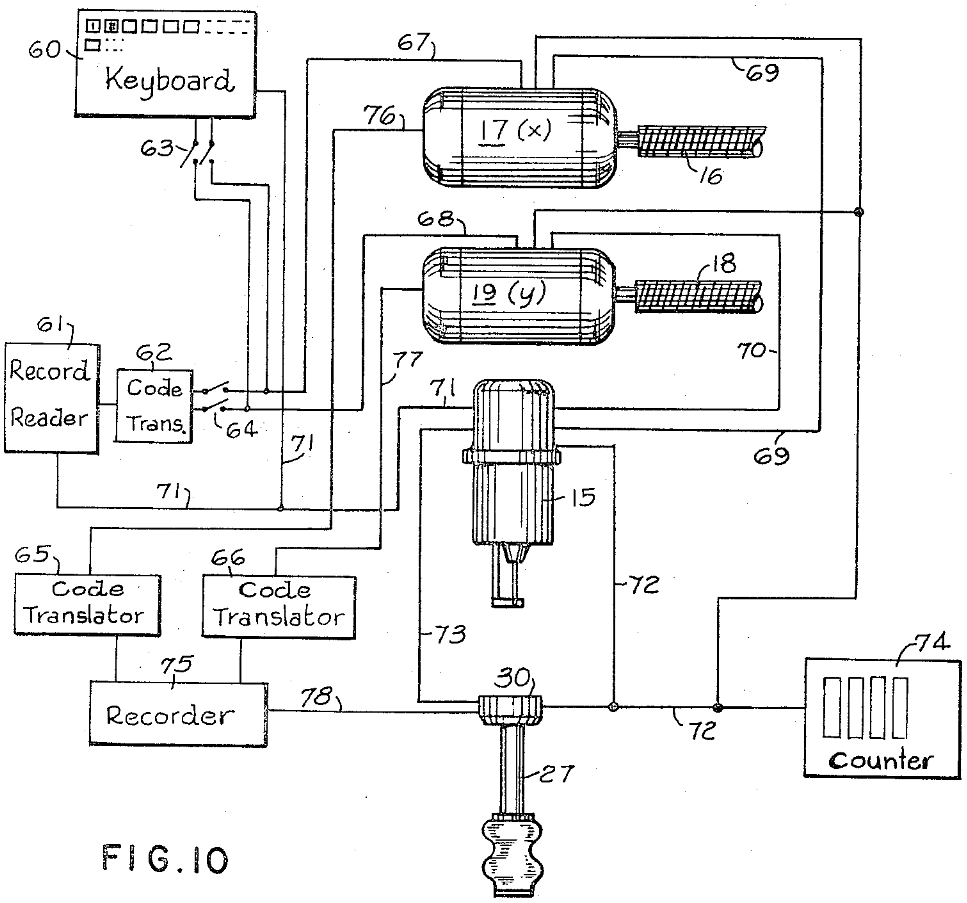
FIGURE 10 shows a block diagram of the servo arrangement.

FIGURE 10 shows a block diagram of the servo arrangement.

Numbers 17 and 19 designate the servo mechanisms which drive the helical shafts 16 and 18 respectively. These servo mechanisms each contain the drive motor as well as a speed sensor and a registering mechanism which registers the numbers of revolutions made by the helical shafts and thereby the positions of the carriages. The servo mechanisms 17 and 19 also contain the required power supplies and are thus entirely self-contained.

The data entry into the cards can be performed from a keyboard, or from a punched card reader, punched paper tape reader or magnetic tape reader 61. Numerals 63 and 64 are switches which set the system for entry from the keyboard 60 or automatic entry from the automatic reader 61. Numeral 62 designates a code translator which translates the code of the automatic reader 61 into the code required for the servo units.

The automatic input is used to drill all holes required in a term card at one time (term by term entry). Instead of drilling one card, one can drill many simultaneously. In this way the device can be used as a card duplicator programmed by the automatic reader 61.

The keyboard input is used for entry of one hole at the time in all term cards pertaining to a document (document by document entry).

For data entry the two coordinates are transmitted from the keyboard 60 or the automatic reader 61 through lines 67 and 68 respectively to the two servo mechanisms 17 and 19, which places the drill carriage in the corresponding position. If both servos have reached the required position, lines 69 and 70 send a signal to the automatic drill 15 which will, upon receipt of both signals, start its automatic drill cycle as described earlier. Upon completion of this cycle, line 71 sends a signal to automatic reader 61 which will thus read the next codes, or to keyboard 60 which will then be cleared for the next entry.

As an automatic scanner and card duplicator, the device of FIGURES 2 and 3 can be programmed by an automatic reader 61 or by the keyboard 60. Either of these devices can first set the combined drill and scanner of FIGURES 2 and 3 to position 00, if a matrix of 100 x 100 is used, and the into position 99. This will send the scanner moving along the first row. Whenever photocell 30 is activated, line 72 will send a signal to the servos to stop the same and the automatic drill to set the drill cycle into motion. After completion of this cycle, line 73 will send a signal to scanner 27, which breaks the signal on line 72 so that servos can resume their path.

When the scanner has reached the end of the row, the keyboard 60 or the automatic reader 61 can place the scanner in the next row and then set it in the code for the position of the end of the row.

An electronic counter 74 tied to line 72 makes a count of the number of times the photocell 30 was activated. This will provide statistical data.

The device can also be used to provide a record of the coordinates of the holes in the card or cards placed in the scanner. In that case the drill is cut out of the circuit and lines 76 and 77 send signals corresponding to the positions of the servos, whenever the servos are stopped by the photocell 30, to the code translators 65 and 66. These then translate the code into one required by the recording device 75, which can be a card punch or a paper tape punch or magnetic tape or any other suitable device. It could also be a form of automatic microfilm device which displays a document corresponding to the code fed into it. After the code has been entered and the document has been viewed, line 78 breaks the signal from the photocell 30 in the line 72 so that the scanner can resume its path.

It is possible to eliminate scanning of rows in which no holes occur by drilling a hole in the margin of the card in every row in which holes have been entered. Such guide holes are designated by numerals *4a* in FIGURE 1. In that case the keyboard 60 or the automatic reader 61 can return the scanner to the beginning of a row and then let it move up until it encounters a guide hole. When it is stopped by a guide hole, the scanner is sent sideways along the X axis for a scan.

Figure 11:
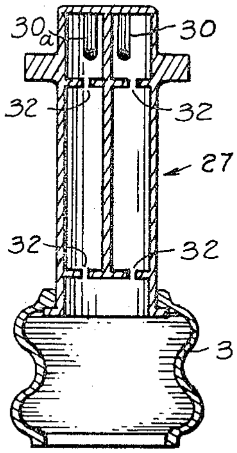
FIGURE 11 shows a modification of the scanning head of FIGURE 4.

Without the use of guide holes 4*a*, a punched card program for the scan would, for example, have two coordinates on each card, the Y and X coordinates respectively. The cards would then contain the following codes: 00,00; 00,99; 01,99; 01,00; 02,00; 02,99; etc.

Where guide holes 4*a* are used, it will be simpler to use a scanning head with two photocells so that the servos will still have to work with a 100 x 100 matrix only. Such a scanning head is shown in FIGURE 11. The second photocell 30*a* reads the guide holes. A signal from cell

30*a* to this automatic programmer 61 will then cause scanner to be moved sideways to scan that row.

Figures 12, 13, 14:
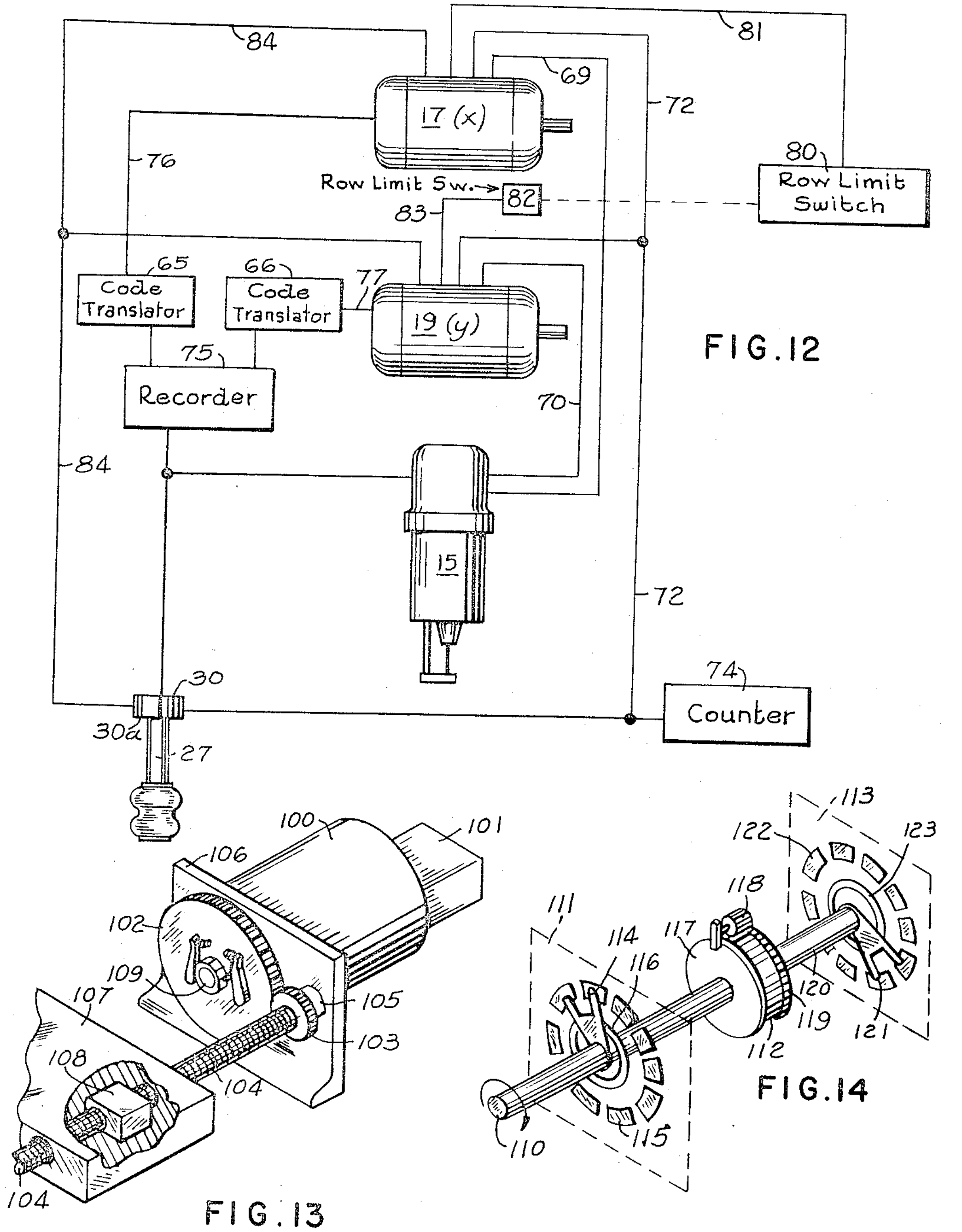
FIGURE 12 shows the block diagram of a self contained scan program.
FIGURE 13 shows physical arrangement of motor, commutator, gears and lead screw of a preferred embodiment of the servo.
FIGURE 14 shows electrical commutator and Geneva gear link of the same.

It is also possible to make a separate small scan-programmer, as shown in FIGURE 12, not based on the use of the keyboard 60 or the automatic reader 61. In that case and when using the guide holes 4*a*, the servo motor is set for continuous travel. When it reaches the end of a row, it is reversed by a limit switch 80 through line 81. Reaching the beginning of the row again, a limit switch 82 stops the X movement through line 83 and starts the Y movement. When the photocell 30*a* is activated, the Y movement is stopped through line 84 and the scanner is sent sideways until it hits the limit switch 80 again. The rest of the circuit is then similar to FIGURE 10.

The device of FIGURES 7 and 8 utilizes the same circuitry with the exception of the drill.

*Preferred servo system for versatile information retrieval system*

A preferred servo system for the purpose of transporting the carriage along its rail in such a manner that the carriage will be positioned automatically at a given point of a large number of points will now be described. Two identical servo systems are required: One for each coordinate axis. Since the servo systems are identical for each axis, only one will be described.

This system is a non-proportional or step type of servo utilizing a slow speed, multipole type of synchronous motor coupled to a rotary commutator and cam switch arrangement for positional feedback. Through appropriate gearing it turns a lead screw coupled to the carriage.

The servo will be explained with the aid of the following figures:

FIGURE 13 shows the component mechanical parts of the servo system. The entire system is mechanically powered by a special motor 100. This motor is energized by alternating current, usually 60 c.p.s. It consists of a multipole, permanent magnet rotor and a multi-pole, usually 100 pole, stator. The motor has a two phase winding and turns in one direction when one winding is energized and turns in the other direction when the other winding is energized. Because of the large number of poles, the rotational rate is slow compared to ordinary synchronous motors. This characteristic permits the motor to stop almost instantaneously or within one electrical pole. Commercially these motors are known as Slo-Syns.

An electrical commutator assembly 101 is coupled to the rear shaft of the motor 100. A motor gear 102 coupled to the motor shaft drives a lead screw gear 103 coupled to the lead screw 104. The lead screw is constrained by bearings 105 which are mounted in a plate 106. The carriage 107 is set in motion by a fixed nut 108 which engages the lead screw 104. A cam switch assembly 109 is also coupled to the motor shaft and plate 106.

The commutator assembly is shown in pictorial detail in FIGURE 14. The commutator is operated by input shaft 110, which in the system is coupled to the rear shaft of the motor. The commutator consists of three general parts: a "units" section 111, a geneva gear assembly 112, and a "tens" section 113. Rotation of the input shaft 110 drives a wiper 114 about a group of equally spaced, electrically conducting segments 115, usually 10 in number. An electrical collector ring 116 provides contact to the wiper 114. The input shaft 110 also turns a one-tooth gear wheel 117 which is an input to a geneva gear assembly, well known in the state-of-the-art. The ratio of this geneva gear assembly corresponds to the number of segments on the commutator, in this case 10 to 1. A four and eight-tooth pinion 118 couples the input gear 117 to the 20th tooth output gear 119. The output gear 119 drives a second shaft 120. The operation of the geneva movement is such that for every complete turn of the input shaft 110, the second shaft 120 makes one-tenth turn at the termination of the completed turn of input shaft 110. A second wiper 121 is coupled to the second shaft 120.

This rotates about a group of segments 122 similar to segments 114. An electrical collector ring 123 provides contact to the wiper 121.

The commutator units section 111 provides ten electrical digit outputs, numerals 0 through 9, corresponding to the position of the motor shaft 110. The tens commutator section 113 provides ten electrical digit outputs, numerals 0 through 9 to correspond to ten full turns of the input shaft 110. The combined output of the two digital commutators gives 100 electrical digits, numerals 00 through 99, for ten full revolutions or 100 positions of the input shaft 110.

Figures 15, 16:
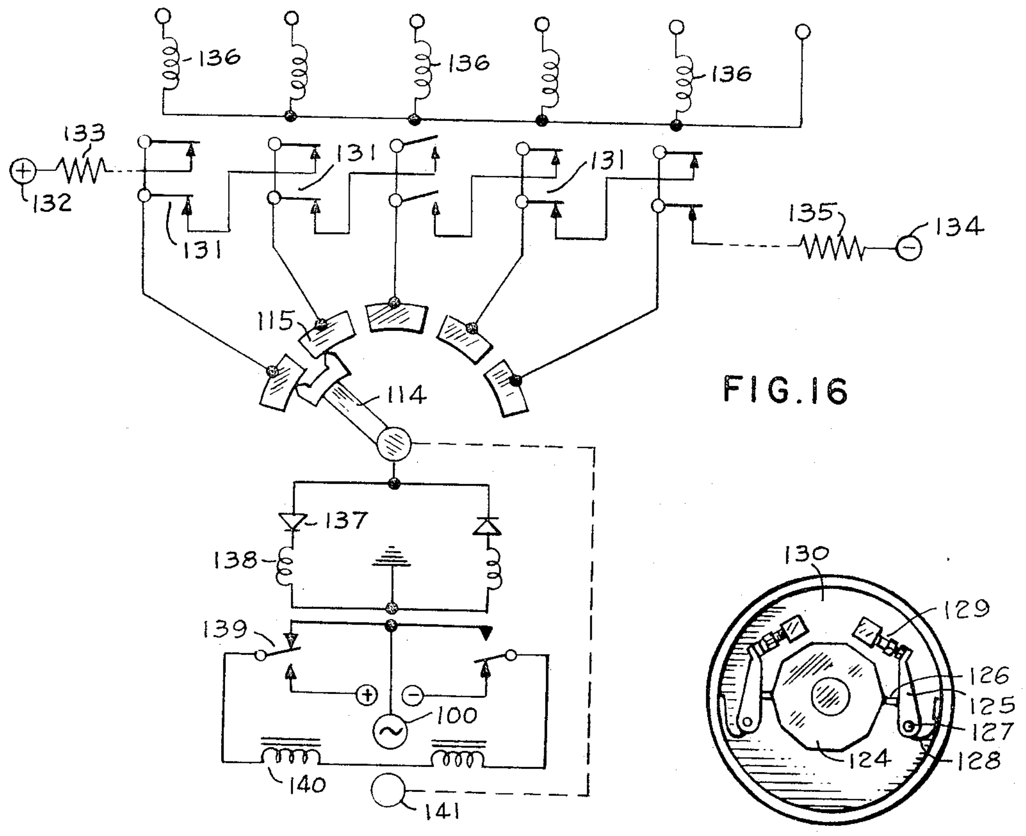
FIGURE 15 shows final positioning switches of the same.
FIGURE 16 shows electrical operation of typical commutator of the same.

An electrical cam switch assembly 109 is shown in pictorial detail in FIGURE 15. This consists of a multi-lobe cam 124, usually having ten lobes which is coupled to the shaft of the motor 100. Two symmetrical electrical switch assemblies are arranged about cam 124. The assembly consists of switch arm 125 possessing a cam follower 126 and pivoting about a point 127. The follower 126 is forced against the cam 124 by spring 128. During a portion of the cam travel the contact arm 125 rests against a fixed contact 129, completing an electrical circuit. All of the above parts except the cam are mounted on a base plate 130 which can be rotated about the shaft for adjustment of the position at which the cam follower 126 strikes a lobe on cam 124. The electrical and mechanical operation of this switch assembly can be compared to that of auto electrical timer points. Proper adjustment of the cam switches for servo operation requires that both switches be electrically open over a small portion of ten general positions of the motor shaft and cam 124. If the cam is rotated slightly off in one direction, then one switch will close. If the cam is rotated slightly off in the other direction, then the other switch will close.

The servo is partially controlled by the electrical circuit shown in FIGURE 16. This relates to position control of the motor using either the "units" or the "tens" commutator since they operate identically. An array of double pole, single throw normally closed switches 131 is arranged and connected as shown in FIGURE 16. The switches are connected together and to a corresponding commutator segment, that is, the switch representing the "5" digit input would be connected to the commutator segment at position 5. The contacts of these switches are connected one to the next so that when all switches are normally closed, a series closed circuit prevails through all digit switches of this array. A positive potential is connected to terminal 132 through series limiting resistor 133 to one end of the switch array. A negative potential is connected to terminal 134 through series limiting resistor 135 to the other end of the switch array. When all switches are normally closed a current will flow through the array which is limited by series resistors 133 and 135. The switches 131 may be operated by relay coils 136. These switches may also be operated by push buttons, mechanical translator bars or other means. These switches may also be solid state electronic devices.

Data is entered into the servo in the following manner. For example, if numeral 5 is to be entered, number 5 switch of the array will be opened by energizing the corresponding relay. When this switch opens, its corresponding commutator segment 115 is electrically isolated and assumes a 0 potential. Current ceases to flow through the switch array since an open circuit has occurred. All switches and commutator segments to the left of numeral 5 assume a positive potential. All switches and commutator segments to the right of numeral 5 assume a negative potential. The commutator wiper 114 must assume one of three potentials, either positive, negative or zero. If it is 0 potential, the servo position is correct and no further action takes place. If the wiper is in a position which gives it a positive potential as shown in FIGURE 16, the following action takes place: A positive potential is placed on the anode of diode 137 causing current to flow through relay coil 138 to ground. Current flow through the relay coil 138 closes its contact 139. This places an alternating current on one phase 140 of the motor 100. The motor armature 141 is mechanically coupled to the commutator wiper 114 and rotates it clockwise. When the commutator wiper 114 reaches the segment 115, corresponding to numeral 5, 0 potential prevails and no current flows through diode 137 and relay coil 138. Relay contact 139 returns to its normal position which removes alternating current from one phase 140 of the motor 100. Motor armature 141 ceases rotation at which point the servo position is satisfied as far as this commutator is concerned. If the commutator wiper had been on a negative potential segment, the opposite relay would operate energizing the other phase of the motor which would turn in a counterclockwise direction until 0 potential was reached.

The commutator wiper 114 is a bridging or shorting type so that at any position it contacts no less than one commutator segment and no more than two commutator segments. This prevents the wiper from losing potential between contacts which would stop motor operation. When both relay contacts 139 are in their normal unenergized position, a DC potential is placed across the two phases of the motor 100. Due to the nature of this type of synchronous motor, the armature becomes locked which in turn locks gears 102, 103, lead screw 104, and carriage 107 in their final position.

Figure 17:
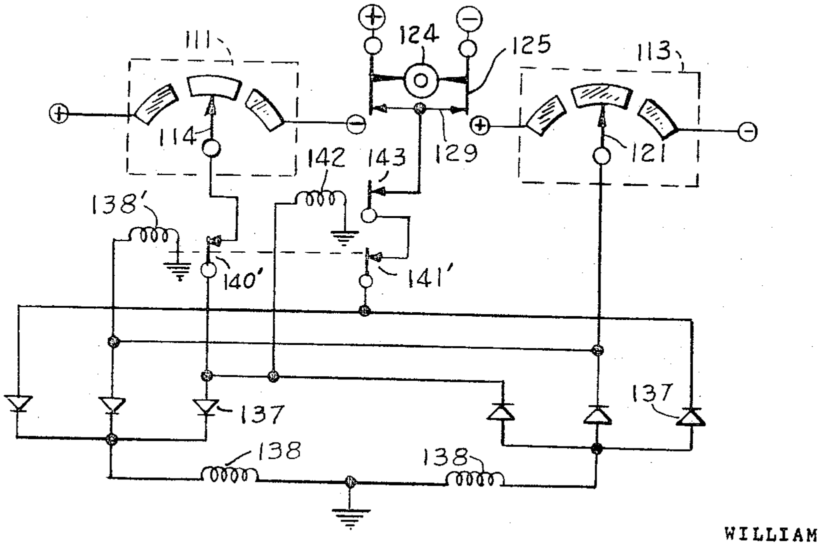
FIGURE 17 shows electrical operation of full servo unit of the same.

For full servo operation three conditions must be satisfied: First, a tens digit must be entered and the servo positioned within its domain; second, a units digit must be entered and the servo positioned within its domain; and third, the motor shaft must be positioned within a discrete point within the units domain by the cam switch. This operation will be explained with reference to FIGURE 17. The wiper 121 of tens commutator 113 is connected through diodes 137 to relay coil 138. An additional double pole, single throw, normally closed relay coil 138' is connected to wiper 121. Operation of this portion of the servo is as described earlier. When 0 potential is attained by wiper 121, relay 138' is de-energized allowing its contacts 140 and 141 to close. This connects units commutator 111 and wiper 114 to diodes 137 and relay coils 138 permitting in turn the units numeral to be satisfied. Relay coil 142 is also connected to the wiper 114. Operation of the units portion of the servo is as described earlier. When wiper 114 attains 0 potential, relay coil 142 is de-energized allowing its contacts 143 to close. This allows the cam switch to take over for final positioning of the motor shaft. If cam 124 is in a position where contact on 125 is touching fixed contact 129, a potential is applied through the now closed relay contact 143 and 141' to diode 137 and relay 138. This causes the motor to turn in a direction which will ultimately open that cam switch contact. The servo operation as described above establishes a precedence of satisfaction from tens digit to units digit to final cam positioning, in that order.

The servo required for the other axis of this information retrieval drilling device works in an identical manner.

The above specifications describe only examples of possible embodiments. The full scope of the invention is not limited thereto but contained within the scope of the claims.

What is claimed is:

1. Servomotor apparatus for performing data handling operations at predetermined quantized positions on data cards or the like, said positions all lying precisely at intersections of mutually orthogonal equally-spaced sets of center lines forming a Cartesian coordinate array on such a card, comprising (a) a support plate, and locating means thereon for positioning at least one such data card, (b) a first carriage mounted on said support plate for movement back and forth in a first direction parallel to one surface of said support plate, (c) a first reversible drive motor connected to drive said first carriage in said first direction, (d) a second carriage mounted on said first carriage for movement back and forth in a second direction parallel to said one surface of said support plate, said second direction being perpendicular to said first direction, (e) a second reversible drive motor connected to drive said second carriage in said second direction, (f) a decade switch mechanism connected to each of said drive motors, for operation thereby to sense the arrival of each carriage at successive locations corresponding precisely to the spacing of said array, (g) program signal generating means for energizing said drive motors in sequence to cause said second carriage to scan in succession along lines parallel to one of said sets of center lines, (h) means carried by said second carriage for performing a localized data handling operation on such a data card, at any of said quantized positions, (i) and means controlled jointly by said sensing mechanism (f) and said program signal generating means (g) for energizing said performing means (h) at selected positions of said array, and for interrupting said generating means (g) during the operation cycle of said performing means (h).

2. Apparatus in accordance with claim 1, in which said performing means (h) comprises a drilling device reciprocable toward and away from a card positioned on said support plate.

3. Apparatus in accordance with claim 1, in which said performing means (h) comprises means for sensing the presence of a hole in a card positioned on said support.

4. Apparatus in accordance with claim 1, including additional locating means on said support plate for positioning at least another such data card in spaced relation to the first-recited data card, and in which said performing means (h) includes a drilling device reciprocable toward and away from said first-recited data card, and a hole-sensing device for cooperation with the other data card, said hole-sensing device being connected for conditional control of said drilling device.

5. Apparatus in accordance with claim 1, in which said generating means (g) comprises a data-record reproducing device.

6. Apparatus in accordance with claim 1, in which said generating means (g) comprises a manually operable keyboard.

7. Apparatus in accordance with claim 3, in which said performing means (h) additionally comprises means for sensing indicia on a marginal portion of such a card, and means responsive to the last-named sensing means for controlling the operation of said generating means (g) to alter the scanning sequence of said second carriage.

8. Apparatus in accordance with claim 3, in which said sensing means comprises a photoelectric device.

9. Apparatus in accordance with claim 3, in which said sensing device comprises a sensitive switch in contact with the card.

10. Apparatus in accordance with claim 3, including means for recording the coordinates of any hole sensed by said sensing means.

11. Apparatus in accordance with claim 1, including counting means connected to said sensing means to register the number of holes sensed thereby.

12. Apparatus for preparing a perforated product card containing holes at coordinate positions corresponding to a logical function of holes present in at least one pre-perforated card, said positions all lying precisely at intersections of mutually orthogonal equally-spaced sets of center lines forming Cartesian coordinate arrays on both such cards, comprising (a) a support plate, and locating means thereon for positioning at least a product card and a pre-perforated card in side-by-side relation, (b) a first carriage mounted on said support plate for movement back and forth in a first direction parallel to one surface of said support plate, (c) a first reversible drive motor connected to drive said first carriage in said first direction, (d) a second carriage mounted on said first carriage for movement back and forth in a second direction parallel to said one surface of said support plate, said second direction being perpendicular to said first direction, (e) a second reversible drive motor connected to drive said second carriage in said second direction, (f) a decade switch mechanism connected to each of said drive motors, for operation thereby to sense the arrival of each carriage at successive locations corresponding precisely to the spacing of said array, (g) program signal generating means for energizing said drive motors in sequence to cause said second carriage to scan in succession along lines parallel to one of said sets of center lines, (h) a card drilling device carried by said second carriage for performing a localized hole-drilling operation on a product card positioned by said locating means, (i) a hole sensing device carried by said second carriage for sensing the existence of holes in a pre-perforated card positioned by said locating means, (j) and means controlled jointly by said sensing mechanism (f), said program signal generating means (g) and said hole sensing device (i) for energizing said card drilling device (h) at positions of said second carriage corresponding to the locations of holes in the pre-perforated card.

References Cited

UNITED STATES PATENTS

| | | | |
|---|---|---|---|
| 1,923,208 | 8/1933 | Howey | 250—219.4 |
| 2,237,898 | 4/1941 | Bitner | 250—219.4 |
| 2,311,142 | 2/1943 | Turrettini | 250—219.4 |
| 2,464,906 | 3/1949 | Unger | 250—219.4 |
| 2,552,622 | 5/1951 | DeNeergaard | 250—202 X |
| 2,807,728 | 9/1957 | Kilburn et al. | 250—219.4 |

RALPH G. NILSON, *Primary Examiner.*

E. STRICKLAND, M. ABRAMSON, *Assistant Examiners.*